Aug. 18, 1964     L. O. VARGADY     3,145,250
MOIRE FRINGE CONSTRUCTIONS INCLUDING A PHASE CHANGE
Filed March 1, 1962                    2 Sheets-Sheet 1
FIG. 1
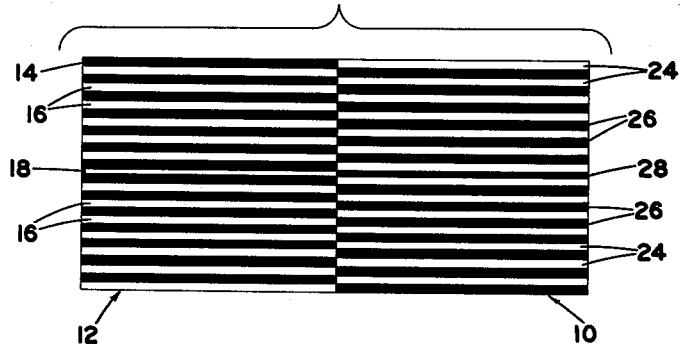
FIG. 3
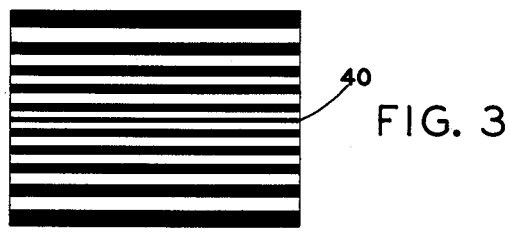
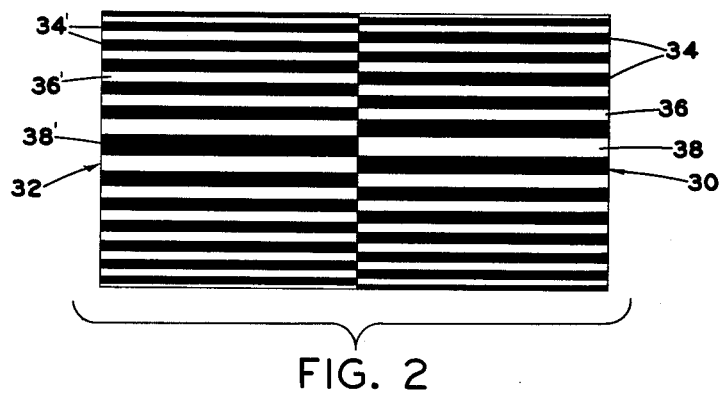
FIG. 2
FIG. 4
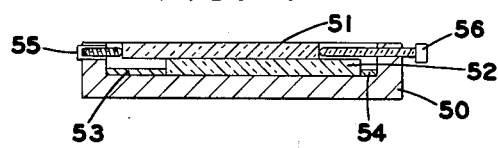
*INVENTOR.*
LESLIE O. VARGADY
BY Frank C. Parker
David E. Doughty
ATTORNEYS United States Patent Office 3,145,250
Patented Aug. 18, 1964

3,145,250
MOIRE FRINGE CONSTRUCTIONS INCLUDING A PHASE CHANGE
Leslie O. Vargady, Rochester, N.Y., assignor to Bausch & Lomb Incorporated, Rochester, N.Y., a corporation of New York
Filed Mar. 1, 1962, Ser. No. 176,523
5 Claims. (Cl. 88—1)

This invention relates to novel moire fringe constructions and more particularly to moire fringe constructions wherein crossed or parallel gratings are incorporated to generate moire fringes. The moire fringes indicate small displacements of one grating with respect to the other by the magnified movement of a fringe.

Moire fringe effects have been previously proposed for use in measuring devices. See for example U.S. Patent 1,415,627 issued to G. E. Giambiasi, May 9, 1922, and Numbers 2,390,122 and 2,451,972 issued to W. P. Powers, December 4, 1945, and October 19, 1948, respectively. Previously known moire fringe devices have been subject to certain limitations in use and have not found wide acceptance. With the current advent of relatively high precision measurement techniques, however, moire fringe devices appear to warrant further development and investigations.

Generally, systems incorporating moire fringes have a common disadvantage. The disadvantage is that it is relatively difficult to distinguish between one fringe and any other fringe. One approach would be to use a relatively expensive electronic counter. The expense of an adequate electronic counter is prohibitive for many applications.

Other approaches to overcome this problem are shown in my copending application Serial Number 108,021 filed March 5, 1961, and in the copending application of Richard J. Pegis, 108,162 filed May 5, 1961, and assigned to the same assignee as the present application. My copending application relates generally to means for producing relatively narrow and sharply defined fringes, while, the Pegis application relates generally to a pair of grids wherein the dark lines of one are of different width than the dark lines of the other.

Advantageously, the moire fringe constructions according to the present application are effective to generate a unique fringe. For example the unique fringe is readily distinguished from any other fringe. Furthermore, it is readily apparent from observing any fringe in the novel construction to determine in which direction the grids should be moved in order to return to the unique fringe.

The presently proposed constructions are expected to have broad application in the field of metrology. For example, in metrology it is often desirable to indicate very small deviations from a standard. Accordingly, an optical readout system incorporating the novel moire fringe constructions may be used to indicate such deviations. The kind of deviation, such as positive or negative movement along mutually opposed directions, is also readily apparent from such indication. The latter feature also facilitates returning the grids to a standard setting. For example the fringes indicate the direction of movement which will return the unique fringe.

The moire fringes generated by the novel constructions are relatively easy and simple to read and may be incorporated in an optical readout system to provide reliable, accurate measurement indications. Devices incorporating the present invention present minimum opportunity for ambiguity in their measurement indications and are capable of a relatively high degree of motion magnification. Notwithstanding the advantageous results obtained by the use of the present invention devices incorporating the present invention are relatively simple and inexpensive to produce. Furthermore, the improvements obtained over the aforementioned applications are obtained at a relatively small increase in cost and without any adverse affect on the simplicity and durability of a device.

It has now been found that novel results may be obtained by using a pair of line grids each having parallel dark lines and clear intervals and each having a similar systematic phase change or phase shift therein. The grids are supported in a predetermined orientation and are movable relative to each other. The improvement resides in incorporating a phase shift in each of the grids. The phase shift comprises a systematic change in line width or spacing widths intermediate of a regular pattern or series of regular widths or regularly spaced lines.

In the preferred embodiment of the invention one of the grids is a contrast or phase reversal of the other. One of the grids can be considered to be a negative copy of the other grid. The grids are used in pairs with their lines either parallel or at a slight angle to each other.

Another embodiment of the invention incorporates a pair of graded or gradient grids. The grids are graded in pitch along their length, that is, in the direction normal to the grid lines which are parallel to each other. The phase shift comprises a change from increasing to decreasing or decreasing to increasing line widths or spacings.

The invention will now be described in more detail in connection with the accompanying drawings in which:

FIG. 1 is an elevational view of a pair of adjacent line grids wherein one grid is a negative copy or phase reversal of the other and both grids include a phase shift;

FIG. 2 is an elevational view of a pair of adjacent line grids wherein the pitch of the line grids changes from increasing to decreasing widths at the phase change;

FIG. 3 is an elevational view of a single line grid wherein the pitch of the line grids changes from decreasing to increasing at the phase change;

FIG. 4 is a cross sectional view of a pair of grids supported in a superimposed position;

Figure 7:
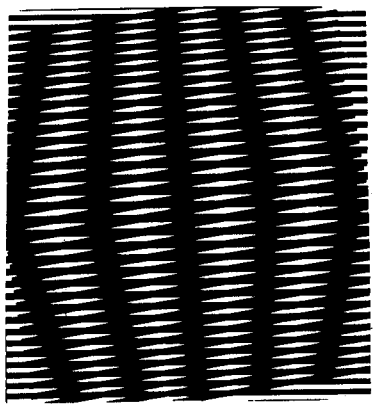
FIG. 7 is an elevational view of a moire fringe produced by a pair of grids generally similar to the grids shown in FIG. 2.

Referring to the drawings, FIGS. 1, 4, 5 and 6 illustrate grid arrangements according to a first embodiment of the invention. Grids of this type are effective to produce moire fringes with a unique fringe separating a plurality of fringes. The two grids 10 and 12 shown in FIG. 1 include similar line widths and spacing widths i.e. the grids have the same pitch. Pitch is defined for use hereinafter as the distance between the center of one line and the center of an adjacent line. The grid 12 according to the preferred embodiment is a negative copy of the grid 10 i.e. the line thickness of the grid 12 corresponds to the spacing thickness of the grid 10.

The lines 14 of the grid 12 are of uniform thickness throughout the grid while the spacings 16 of the grid 12 are uniform throughout the grid with the exception of the phase change 18. The phase change is illustrated as a relatively narrow spacing with respect to the spacing 16. However, it is to be understood that the phase change could comprise a relatively wide spacing. The spacings 24 in the grid 10 are of uniform width throughout the grid however, the phase shift 28 is a relatively narrow line 28. The line 28 is narrower than the uniform widths of the lines 26.

Figure 6:
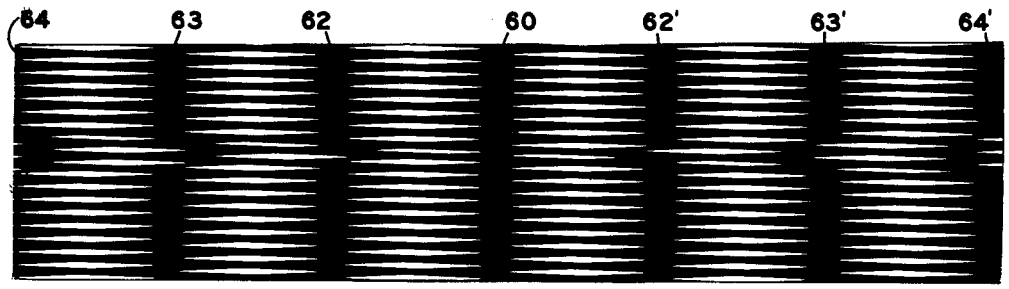
FIG. 6 is an elevational view of a moire fringe produced by the grid shown in FIG. 5, and a negative copy thereof.
Figure 5:
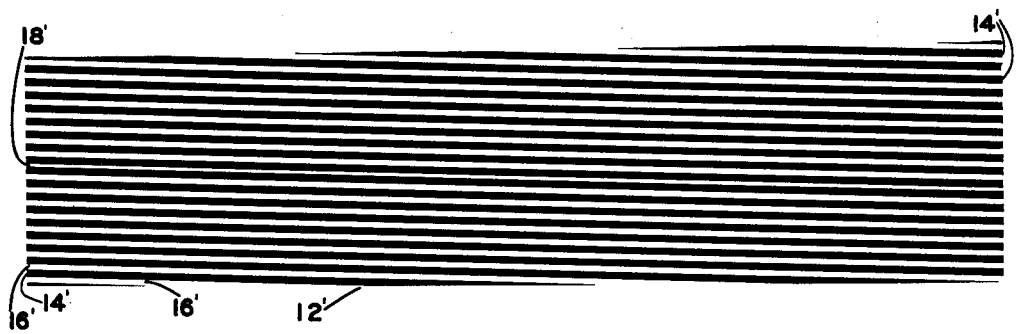
FIG. 5 is an elevational view of a single grid according to a first embodiment of the invention.

The line grid 12' shown in FIG. 5 is similar to the grid 12. The grid 12' includes lines 14', spacings 16' and a phase change 18', a second line grid (not shown) which is a negative copy of the line grid 12' is generally similar to the grid 10. When the grid 12' is superimposed at a small angle to its negative copy, the moire fringes shown in FIG. 6 are produced. A unique fringe 60 is a straight line without imperfections therein, while the fringes 62 and 62' differ from the fringe 60. The fringes 62, 62' have imperfections therein which resemble arrows pointing toward the unique fringe 60. The imperfections occur at the intersection of the phase reversals. These imperfections are more pronounced in the subsequent fringes 63, 63' and 64, 64'. As the fringes move farther away from the unique fringe 60 the imperfections become more pronounced and therefore tend to indicate the direction and magnitude of movement required to return to the unique fringe 60.

FIGS. 2, 3, 7 and 8 incorporate the graded or gradient principle disclosed in my aforementioned copending application. FIG. 2 illustrates a pair of graded grids 30 and 32 having alternate opaque lines 34, 34' and transparent or clear intervals 36, 36' the pitch being relatively small at the top and base of the respective grids and increasing progressively toward the center of the respective grids. The variation in pitch is progressive and increases as the lines and spacings approach the phase change 38, 38'. The respective intervals 36, 36' are equal in width to the corresponding line widths of the other grid. If it is desired to maximize the definition and contrast of the fringes, the grids may be constructed as described and claimed in the aforementioned copending application of Richard Pegis.

When a pair of fringes generally similar to those shown in FIG. 2 are superimposed at a slight angle to each other the resulting fringes will resemble those shown in FIG. 7. The grids shown in FIG. 2 are larger than those used to obtain the novel fringe shown in FIG. 7. The widths of the individual lines in the grids used in FIG. 7 are relatively thin and the differences between successive lines and spacing are relatively small. These minor differences may be obtained by ruling facilities. FIG. 2 is shown with relatively greater differences for illustrative purposes.

Figure 8:
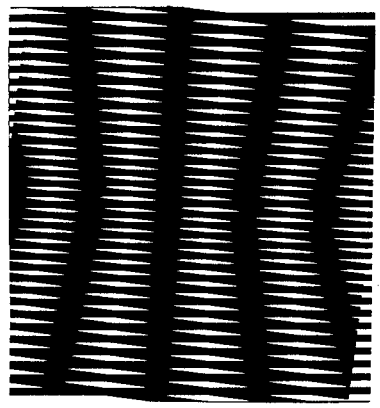
FIG. 8 is an elevational view of a moire fringe produced by a grid generally similar to the grid shown in FIG. 3 and a negative copy thereof.

The grid shown in FIG. 3 illustrates the type of grid used to obtain the fringe shown in FIG. 8. The grid shown in FIG. 3 is somewhat similar to those shown in FIG. 2. Line and spacing widths in FIG. 3 decrease as the parallel lines approach the phase change 40. The phase change 40 is a single relatively thin solid line where the pattern changes from decreasing pitch to increasing pitch.

Means for supporting the grids in superimposed position are shown in FIG. 4. A metal support 50 has a grid 52 mounted in the base thereof. The grid 50 is fixed in position by the stops 53 and 54. The second grid 51 is superimposed on the first grid 52 and resiliently biased in a first direction by the spring assembly 55. Means 56 such as an adjusting screw are provided for moving the grid 51 against the bias 55. The grid 51 is moved with respect to the first grid 52 along mutually opposed direction. The support 50 is also effective to maintain the angular orientation between the grids.

What is claimed is:

1. A moire fringe construction comprising a superimposed pair of line grids each including parallel dark lines and clear intervals, the lines of one of said grids disposed at a slight angle with respect to the lines of the other of said grid to thereby form a predetermined angular orientation, means supporting said grids in the predetermined orientation and movable relative to each other in a direction transverse to the line structure and each of said grids including a regular pattern and a phase change in said pattern.

2. A moire fringe construction according to claim 1 in which each of said grids includes a regular repetitive pattern on each side of said phase change whereby relative movement between said grids will produce moire fringes having a unique fringe when said grids are in a predetermined position.

3. A moire fringe construction according to claim 2 wherein said regular repetitive patterns comprise parallel dark lines and clear intervals of approximately equal widths.

4. A moire fringe construction comprising a superimposed pair of line grids each including parallel spaced lines, the lines of one of said grids disposed at a slight angle with respect to the lines of the other of said grids to thereby form a predetermined angular orientation, and the pitch of said grids being gradient in a direction transverse to said lines, a phase change in the gradient wherein the progressively increasing line widths change to progressively decreasing line widths, and means mounting said grids in relatively movable relationship in a direction transverse to the line structure while maintaining their lines in the predetermined angular orientations to each other.

5. A moire fringe construction comprising a superimposed pair of line grids each including parallel spaced lines, the lines of one of said grids disposed at a slight angle with respect to the lines of the other of said grids to thereby form a predetermined angular orientation, and the pitch of said grids being gradient in a direction transverse to said lines, a phase change in the gradient wherein the progressively decreasing line widths change to progressively increasing line widths, and means mounting said grids in relatively movable relationship while maintaining their lines in the predetermined angular orientation to each other.

References Cited in the file of this patent

UNITED STATES PATENTS

| | | |
|---|---|---|
| 2,179,000 | Tea | Nov. 7, 1939 |
| 2,945,959 | Atkinson | July 19, 1960 |